US012625894B1

(12) United States Patent
Chawla et al.

(10) Patent No.: US 12,625,894 B1
(45) Date of Patent: *May 12, 2026

(54) MULTI-TENANCY RETRIEVAL-ACCESS GENERATION INGESTION VERSIONING

(71) Applicant: Dell Products L.P., Round Rock, TX (US)

(72) Inventors: Gaurav Chawla, Austin, TX (US); Adam E. Brenner, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,756

(22) Filed: Nov. 13, 2024

(51) Int. Cl.
 *G06F 16/334* (2025.01)
 *G06F 16/38* (2019.01)

(52) U.S. Cl.
 CPC ........ *G06F 16/3344* (2019.01); *G06F 16/381* (2019.01)

(58) Field of Classification Search
 CPC .................................................. G06F 16/3344
 See application file for complete search history.

(56) References Cited

U.S. PATENT DOCUMENTS 10,725,993 B1 7/2020 Sivasubramanian

OTHER PUBLICATIONS

Chawla et al. "Retreival-Access Generation Ingestion Versioning" U.S. Appl. No. 18/946,737, filed Nov. 13, 2024, 47 pages (Year: 2024).*
Chawla, et al. "Retrieval-Access Generation Ingestion Versioning" U.S. Appl. No. 18/946,737, filed Nov. 13, 2024, 47 pages.
Office Action mailed Aug. 19, 2025 for U.S. Appl. No. 18/946,737, 41 pages.
Zhao et al. Retrieval-Augmented Generation for AI-Generated Content: A Survey. arXiv:2402.19473v6, Jun. 2024. pp. 1-22. (Year: 2024).
Designing a System to Store Both Files and Objects. Aug. 2024, pp. 1-8. https://blog.purestorage.com/products/designing-a-system-to-store-both-files-and-objects/. (Year: 2024).

(Continued)

*Primary Examiner* — Van H Oberly
(74) *Attorney, Agent, or Firm* — Amin, Turocy & Watson, LLP

(57) ABSTRACT

A system can store a group of checkpoints that comprises respective pairs comprising respective identifications of at least some respective data stored in a storage system and respective second generation identifiers that correspond to the at least some respective data. The system can, based on ingesting data from the storage system and to send the data to be ingested by a first retrieval-augmented generation system, identify a first checkpoint among the group of checkpoints, query a search system to identify a first portion of the data having respective third generation identifiers that are greater than the respective second generation identifiers in the first checkpoint, wherein the search system stores respective metadata of the at least some respective data from the storage system, and ingest the first portion of the data into the first retrieval-augmented generation system.

20 Claims, 10 Drawing Sheets

300↴

(56)     References Cited

OTHER PUBLICATIONS

Hosea et al. Transforming Data Warehouses into Dynamic Knowl-edge Bases for RAG. Scientific Research Journal of Science, Engineering and Technology 2:1, 2024, pp. 5-10. (Year: 2024).
Office Action mailed Jan. 9, 2026 for U.S. Appl. No. 18/946,737, 43 pages.
Shi et al. "Enhancing Retrieval and Managing Retrieval: A Four-Module Synergy for Improved Quality and Efficiency in RAG Systems". arXiv:2407.10670v1, Jul. 2024, pp. 1-9. (Year: 2024).

* cited by examiner

100

REMOTE COMPUTER 106

COMMUNICATIONS
NETWORK
104

COMPUTER SYSTEM 102

MULTI-TENANCY RAG INGESTION VERSIONING
COMPONENT 108

STORAGE SYSTEM 110
FILES 112

RAG APPLICATION(S) 114
CHUNKS 116     EMBEDDINGS 118

RAG FRAMEWORK 120

STATE FILE(S) 122

SEARCH SYSTEM 124
FILE METADATA 126

200

COMPRISES RAG INGESTION VERSIONING
COMPONENT 210

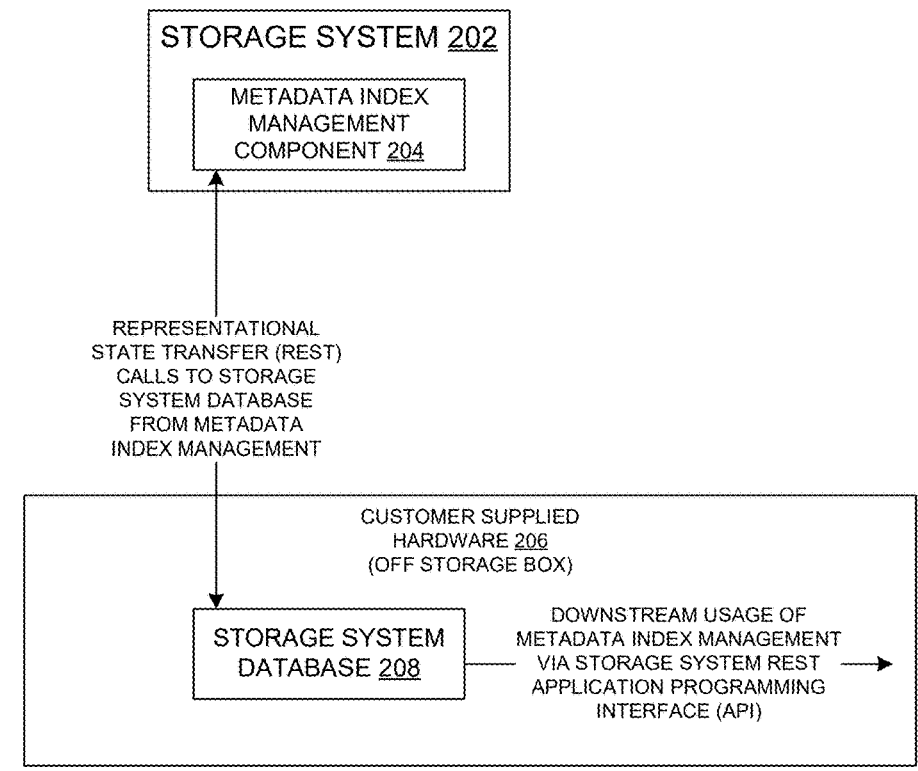

STORAGE SYSTEM 202

METADATA INDEX
MANAGEMENT
COMPONENT 204

REPRESENTATIONAL
STATE TRANSFER (REST)
CALLS TO STORAGE
SYSTEM DATABASE
FROM METADATA
INDEX MANAGEMENT

CUSTOMER SUPPLIED
HARDWARE 206
(OFF STORAGE BOX)

STORAGE SYSTEM
DATABASE 208

DOWNSTREAM USAGE OF
METADATA INDEX MANAGEMENT
VIA STORAGE SYSTEM REST
APPLICATION PROGRAMMING
INTERFACE (API)

FIG. 2

300

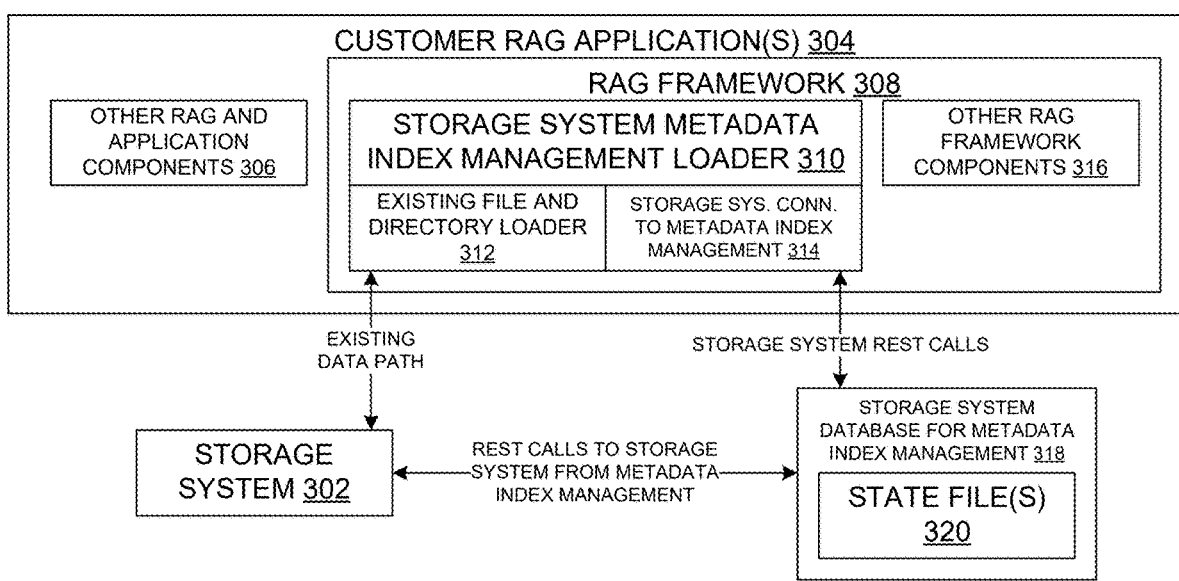

CUSTOMER RAG APPLICATION(S) 304

RAG FRAMEWORK 308

OTHER RAG AND APPLICATION COMPONENTS 306

STORAGE SYSTEM METADATA INDEX MANAGEMENT LOADER 310

EXISTING FILE AND DIRECTORY LOADER 312

STORAGE SYS. CONN. TO METADATA INDEX MANAGEMENT 314

OTHER RAG FRAMEWORK COMPONENTS 316

EXISTING DATA PATH

STORAGE SYSTEM REST CALLS

STORAGE SYSTEM 302

REST CALLS TO STORAGE SYSTEM FROM METADATA INDEX MANAGEMENT

STORAGE SYSTEM DATABASE FOR METADATA INDEX MANAGEMENT 318

STATE FILE(S) 320

```
State File Record: <unique-application-name>
{
        "folder_paths": [
                {
                        "path": "/johndoe/data",
                        "version": 1
                        "generation": 42
                },
                {
                        "path": "/johndoe/data",
                        "version": 2
                        "generation": 56
                }
        ]
}
```

500

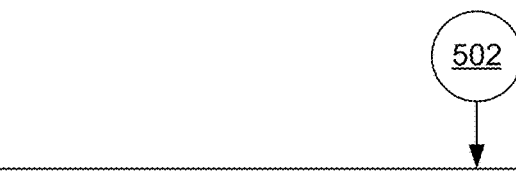

( 502 )

ADDING TWO PARAMETERS TO A DATA CONNECTOR: APPLICATION NAME AND APPLICATION VERSION 504

THE DATA CONNECTOR, WHEN CALLED, CHECKING TO SEE IF A STATE FILE WITH THE UNIQUE APPLICATION NAME EXISTS 506

ISSUING A SEARCH SERVER SCROLL QUERY TO FIND ALL ENTRIES THAT HAVE A GENERATION ID THAT IS GREATER THAN THE ONE FROM THE PREVIOUS INGESTION; PASSING THE LIST OF FILES TO OPERATION 512 508

PASSING THE LIST OF FILES OR LIST OF DIRECTORIES (PATHS) ASYNCHRONOUSLY TO EXISTING AN RAG FRAMEWORK THAT PROCESSES DATA 510

UPDATING THE STATE FILE TO RECORD THE HIGHEST GENERATION ID THAT THE DOCUMENT LOADER PROCESSED FROM OPERATION 510 FOR THE SPECIFIC APPLICATION AND VERSION NUMBER 512

600
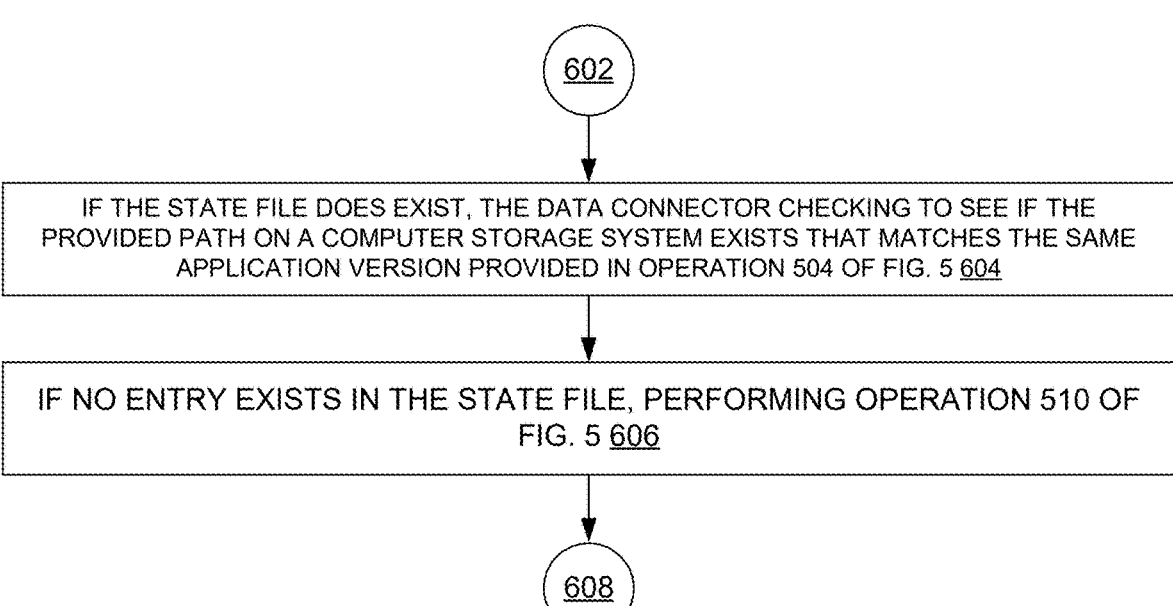
( 602 )
IF THE STATE FILE DOES EXIST, THE DATA CONNECTOR CHECKING TO SEE IF THE PROVIDED PATH ON A COMPUTER STORAGE SYSTEM EXISTS THAT MATCHES THE SAME APPLICATION VERSION PROVIDED IN OPERATION 504 OF FIG. 5 604
IF NO ENTRY EXISTS IN THE STATE FILE, PERFORMING OPERATION 510 OF FIG. 5 606
( 608 )
FIG. 6

700

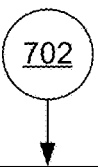

702

STORING A GROUP OF CHECKPOINTS THAT COMPRISES RESPECTIVE PAIRS, THE RESPECTIVE PAIRS COMPRISING RESPECTIVE IDENTIFICATIONS OF AT LEAST SOME RESPECTIVE DATA STORED IN A STORAGE SYSTEM AND RESPECTIVE SECOND GENERATION IDENTIFIERS THAT CORRESPOND TO THE AT LEAST SOME RESPECTIVE DATA, WHEREIN A FIRST CHECKPOINT OF THE GROUP OF CHECKPOINTS CORRESPONDS TO A FIRST RETRIEVAL-AUGMENTED GENERATION SYSTEM OF A GROUP OF RETRIEVAL-AUGMENTED GENERATION SYSTEMS FOR WHICH A RETRIEVAL-AUGMENTED GENERATION PROCESS IS CONFIGURED TO INGEST DATA, AND WHEREIN THE RETRIEVAL-AUGMENTED GENERATION PROCESS IS CONFIGURED TO INGEST DATA VIA A COMMUNICATIONS PROTOCOL THAT OMITS TRACKING OF PREVIOUSLY-INGESTED DATA 704

BASED ON EXECUTING THE RETRIEVAL-AUGMENTED GENERATION PROCESS COMPRISING PERFORMANCE OF AN ITERATION OF INGESTING DATA FROM THE STORAGE SYSTEM AND TO SEND THE DATA TO BE INGESTED BY THE FIRST RETRIEVAL-AUGMENTED GENERATION SYSTEM, IDENTIFYING THE FIRST CHECKPOINT AMONG THE GROUP OF CHECKPOINTS BASED ON THE FIRST CHECKPOINT COMPRISING AN INDICATION OF THE FIRST RETRIEVAL-AUGMENTED GENERATION SYSTEM, QUERYING A SEARCH SYSTEM TO IDENTIFY A FIRST PORTION OF THE DATA HAVING RESPECTIVE THIRD GENERATION IDENTIFIERS THAT ARE GREATER THAN THE RESPECTIVE SECOND GENERATION IDENTIFIERS IN THE FIRST CHECKPOINT, WHEREIN THE SEARCH SYSTEM STORES RESPECTIVE METADATA OF THE AT LEAST SOME RESPECTIVE DATA FROM THE STORAGE SYSTEM, AND WHEREIN THE RESPECTIVE METADATA COMPRISES RESPECTIVE FIRST GENERATION IDENTIFIERS THAT INDICATE RESPECTIVE UPDATES TO THE RESPECTIVE DATA, INGESTING THE FIRST PORTION OF THE DATA INTO THE FIRST RETRIEVAL-AUGMENTED GENERATION SYSTEM WHILE REFRAINING FROM INGESTING A SECOND PORTION OF THE DATA HAVING CORRESPONDING FOURTH GENERATION IDENTIFIERS THAT ARE LESS THAN OR EQUAL TO THE CORRESPONDING SECOND GENERATION IDENTIFIERS IN THE FIRST CHECKPOINT, AND SERVICING QUERIES TO THE FIRST RETRIEVAL-AUGMENTED GENERATION SYSTEM BASED ON THE INGESTING OF THE FIRST PORTION OF THE DATA 706

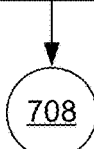

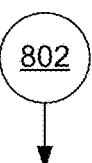

802

STORING A GROUP OF CHECKPOINTS THAT COMPRISE PAIRS, RESPECTIVE PAIRS OF THE PAIRS COMPRISING RESPECTIVE IDENTIFICATIONS OF RESPECTIVE DATA STORED IN A STORAGE SYSTEM AND RESPECTIVE SECOND GENERATION IDENTIFIERS THAT CORRESPOND TO THE RESPECTIVE DATA 804

BASED ON EXECUTING A RETRIEVAL-AUGMENTED GENERATION PROCESS COMPRISING PERFORMANCE OF AN ITERATION OF INGESTING THE DATA FROM THE STORAGE SYSTEM AND TO SEND THE DATA TO BE INGESTED BY A FIRST RETRIEVAL-AUGMENTED GENERATION SYSTEM OF A GROUP OF RETRIEVAL-AUGMENTED GENERATION SYSTEMS, IDENTIFYING A FIRST CHECKPOINT AMONG THE GROUP OF CHECKPOINTS BASED ON THE FIRST CHECKPOINT COMPRISING AN INDICATION OF THE FIRST RETRIEVAL-AUGMENTED GENERATION SYSTEM, QUERYING A SEARCH SYSTEM TO IDENTIFY A FIRST PORTION OF THE DATA HAVING RESPECTIVE THIRD GENERATION IDENTIFIERS THAT ARE GREATER THAN THE RESPECTIVE SECOND GENERATION IDENTIFIERS IN THE FIRST CHECKPOINT, WHEREIN THE SEARCH SYSTEM STORES RESPECTIVE METADATA OF THE AT LEAST SOME RESPECTIVE DATA FROM THE STORAGE SYSTEM, AND WHEREIN THE RESPECTIVE METADATA COMPRISES RESPECTIVE FIRST GENERATION IDENTIFIERS THAT INDICATE RESPECTIVE UPDATES TO THE RESPECTIVE DATA, INGESTING THE FIRST PORTION OF THE DATA INTO THE FIRST RETRIEVAL-AUGMENTED GENERATION SYSTEM WHILE REFRAINING FROM INGESTING A SECOND PORTION OF THE DATA HAVING CORRESPONDING FOURTH GENERATION IDENTIFIERS THAT ARE LESS THAN OR EQUAL TO THE CORRESPONDING SECOND GENERATION IDENTIFIERS IN THE FIRST CHECKPOINT, AND SERVICING QUERIES TO THE FIRST RETRIEVAL-AUGMENTED GENERATION SYSTEM BASED ON THE INGESTING OF THE FIRST PORTION OF THE DATA 806

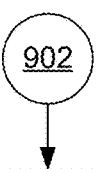

902

BASED ON EXECUTING A RETRIEVAL-AUGMENTED GENERATION FRAMEWORK COMPRISING PERFORMANCE OF AN ITERATION OF INGESTING DATA FROM A STORAGE SYSTEM AND TO SEND THE DATA TO BE INGESTED BY A FIRST RETRIEVAL-AUGMENTED GENERATION SYSTEM, IDENTIFYING A FIRST STATE FILE AMONG A GROUP OF STATE FILES BASED ON THE FIRST STATE FILE COMPRISING AN INDICATION OF THE FIRST RETRIEVAL-AUGMENTED GENERATION SYSTEM 904

QUERYING A SEARCH SYSTEM TO IDENTIFY A FIRST PORTION OF THE DATA HAVING RESPECTIVE THIRD GENERATION IDENTIFIERS THAT ARE GREATER THAN THE RESPECTIVE SECOND GENERATION IDENTIFIERS IN THE FIRST STATE FILE, WHEREIN THE SEARCH SYSTEM STORES RESPECTIVE METADATA OF THE RESPECTIVE DATA FROM THE STORAGE SYSTEM, WHEREIN THE RESPECTIVE METADATA COMPRISES RESPECTIVE FIRST GENERATION IDENTIFIERS THAT INDICATE RESPECTIVE UPDATES TO THE RESPECTIVE DATA 906

INGESTING THE FIRST PORTION OF THE DATA INTO THE FIRST RETRIEVAL-AUGMENTED GENERATION SYSTEM WHILE REFRAINING FROM INGESTING A SECOND PORTION OF THE DATA HAVING CORRESPONDING FOURTH GENERATION IDENTIFIERS THAT ARE LESS THAN OR EQUAL TO THE CORRESPONDING SECOND GENERATION IDENTIFIERS IN THE FIRST STATE FILE 908

SERVICING QUERIES TO THE FIRST RETRIEVAL-AUGMENTED GENERATION SYSTEM BASED ON THE INGESTING OF THE FIRST PORTION OF THE DATA 910

MULTI-TENANCY RETRIEVAL-ACCESS GENERATION INGESTION VERSIONING

RELATED APPLICATIONS

The subject patent application is related by subject matter to, U.S. patent application Ser. No. 18/946,737, filed Nov. 13, 2024 and entitled "RETRIEVAL-ACCESS GENERATION INGESTION VERSIONING," the entirety of which application is hereby incorporated by reference herein.

BACKGROUND

A retrieval-access generation (RAG) system can generally comprise a large language model (LLM) that operates on a specific information set (e.g., a set of documents) so that the LLM is configured to respond to queries based on that information set. A LLM can generally comprise a form of generative artificial intelligence (AI) that is configured to generative natural-language response outputs to natural-language query inputs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can store a group of checkpoints that comprises respective pairs, the respective pairs comprising respective identifications of at least some respective data stored in a storage system and respective second generation identifiers that correspond to the at least some respective data, wherein a first checkpoint of the group of checkpoints corresponds to a first retrieval-augmented generation system of a group of retrieval-augmented generation systems for which a retrieval-augmented generation process is configured to ingest data, and wherein the retrieval-augmented generation process is configured to ingest data via a communications protocol that omits tracking of previously-ingested data. The system can, based on executing the retrieval-augmented generation process comprising performance of an iteration of ingesting data from the storage system and to send the data to be ingested by the first retrieval-augmented generation system, identify the first checkpoint among the group of checkpoints based on the first checkpoint comprising an indication of the first retrieval-augmented generation system, query a search system to identify a first portion of the data having respective third generation identifiers that are greater than the respective second generation identifiers in the first checkpoint, wherein the search system stores respective metadata of the at least some respective data from the storage system, and wherein the respective metadata comprises respective first generation identifiers that indicate respective updates to the respective data, ingest the first portion of the data into the first retrieval-augmented generation system while refraining from ingesting a second portion of the data having corresponding fourth generation identifiers that are less than or equal to the corresponding second generation identifiers in the first checkpoint, and service queries to the first retrieval-augmented generation system based on the ingesting of the first portion of the data.

An example method can comprise storing, by a system comprising at least one processor, a group of checkpoints that comprise pairs, respective pairs of the pairs comprising respective identifications of respective data stored in a storage system and respective second generation identifiers that correspond to the respective data. The method can further comprise, based on executing a retrieval-augmented generation process comprising performance of an iteration of ingesting the data from the storage system and to send the data to be ingested by a first retrieval-augmented generation system of a group of retrieval-augmented generation systems, identifying, by the system, a first checkpoint among the group of checkpoints based on the first checkpoint comprising an indication of the first retrieval-augmented generation system, querying, by the system, a search system to identify a first portion of the data having respective third generation identifiers that are greater than the respective second generation identifiers in the first checkpoint, wherein the search system stores respective metadata of the at least some respective data from the storage system, and wherein the respective metadata comprises respective first generation identifiers that indicate respective updates to the respective data, ingesting, by the system, the first portion of the data into the first retrieval-augmented generation system while refraining from ingesting a second portion of the data having corresponding fourth generation identifiers that are less than or equal to the corresponding second generation identifiers in the first checkpoint, and servicing, by the system, queries to the first retrieval-augmented generation system based on the ingesting of the first portion of the data.

An example non-transitory computer-readable medium can comprise instructions that, in response to execution, cause a system comprising a processor to perform operations. These operations can comprise, based on executing a retrieval-augmented generation framework comprising performance of an iteration of ingesting data from a storage system and to send the data to be ingested by a first retrieval-augmented generation system, identifying a first state file among a group of state files based on the first state file comprising an indication of the first retrieval-augmented generation system. These operations can further comprise querying a search system to identify a first portion of the data having respective third generation identifiers that are greater than the respective second generation identifiers in the first state file, wherein the search system stores respective metadata of the respective data from the storage system, wherein the respective metadata comprises respective first generation identifiers that indicate respective updates to the respective data. These operations can further comprise ingesting the first portion of the data into the first retrieval-augmented generation system while refraining from ingesting a second portion of the data having corresponding fourth generation identifiers that are less than or equal to the corresponding second generation identifiers in the first state file. These operations can further comprise servicing queries to the first retrieval-augmented generation system based on the ingesting of the first portion of the data.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates another example system architecture that can facilitate multi-tenancy RAG ingestion versioning, in accordance with an embodiment of this disclosure;

FIG. 3 illustrates another example system architecture that can facilitate multi-tenancy RAG ingestion versioning, in accordance with an embodiment of this disclosure;

FIG. 5 illustrates an example process flow that can facilitate multi-tenancy RAG ingestion versioning, in accordance with an embodiment of this disclosure;

FIG. 6 illustrates another example process flow that can facilitate multi-tenancy RAG ingestion versioning, in accordance with an embodiment of this disclosure;

FIG. 7 illustrates another example process flow that can facilitate multi-tenancy RAG ingestion versioning, in accordance with an embodiment of this disclosure;

FIG. 8 illustrates another example process flow that can facilitate multi-tenancy RAG ingestion versioning, in accordance with an embodiment of this disclosure;

FIG. 9 illustrates another example process flow that can facilitate multi-tenancy RAG ingestion versioning, in accordance with an embodiment of this disclosure.

DETAILED DESCRIPTION

Overview

Figure 1:
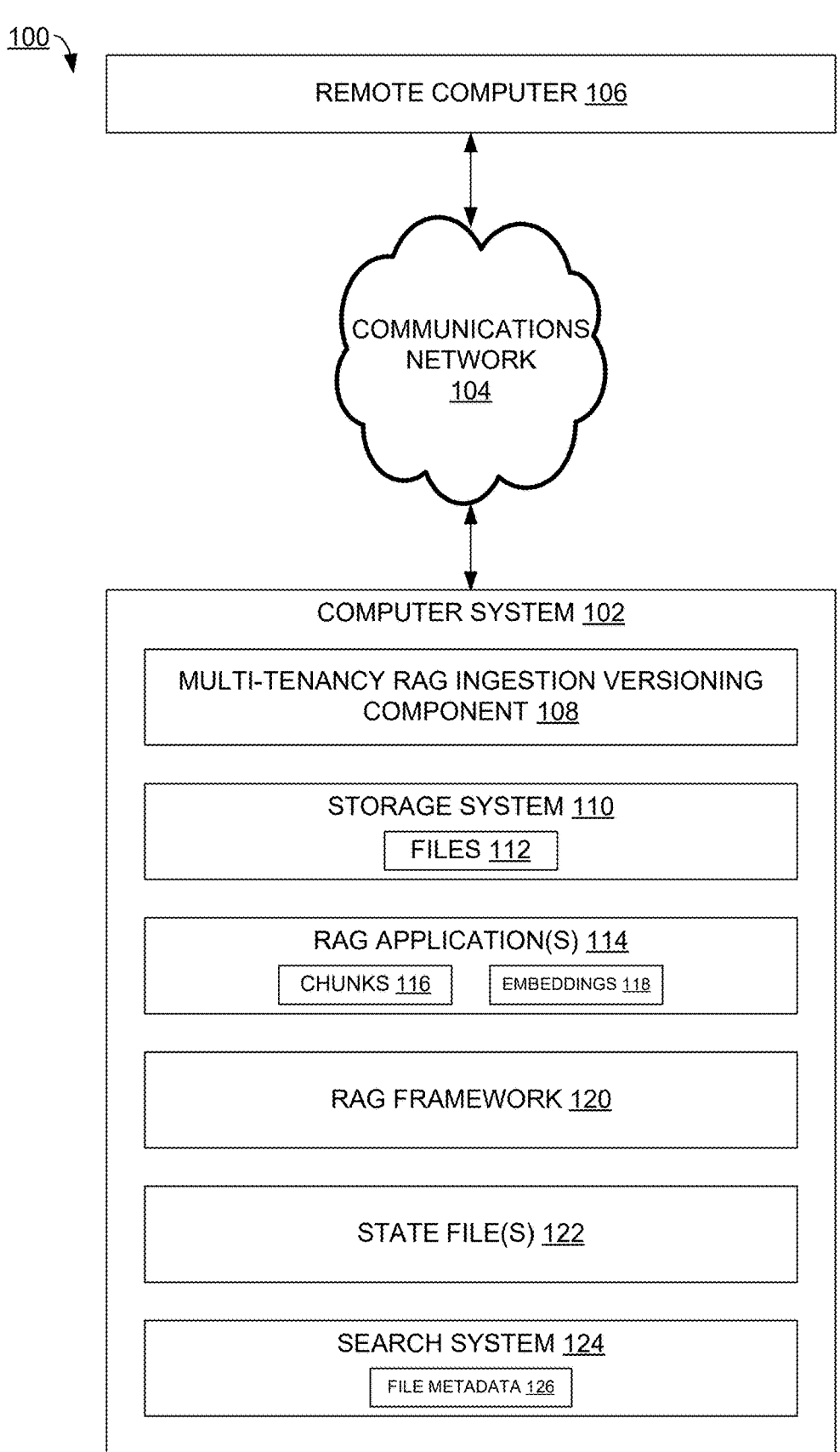
FIG. 1 illustrates an example system architecture that can facilitate multi-tenancy RAG ingestion versioning, in accordance with an embodiment of this disclosure.

In computer storage systems, there can be metadata index management. Metadata index management can comprise periodically exporting file system metadata from the computer storage system to a remote computer endpoint that can facilitate searching on that data.

It can be that metadata index management utilizes file backup snapshots (and an application programming interface (API) that facilitates determining differences between two snapshots).

The present techniques can implement metadata index management with artificial intelligence (AI) retrieval-augmented generation (RAG) systems to extend functionality, features, and integrations in accessing information about the files on a computer storage system.

A RAG framework can generally comprise a component that can read from source data and ingest it into a RAG application. There can be AI RAG frameworks that can read data from a computer storage system via various protocols (e.g., an object storage protocol or a network file storage (NFS) protocol. However, it can be that these frameworks do not keep track of which files were previously read, so do not perform detection of file changes.

A result can be a RAG framework that treats all data as brand new, regardless of whether 1 file or 1 billion files have changed. This can result in the RAG framework taking more time to process file changes, and consuming more compute and storage resources for a data ingestion process, compared with an implementation that does track file changes.

While it can be that prior protocols to read data from a computer storage system lack a mechanism to detect file changes, the computer storage system itself can track file changes.

The present techniques can be implemented to utilize metadata index management to create a document loader to a RAG framework that tracks which files have been processed and read by the RAG framework. When a RAG framework is re-run to ingest new data, the document loader can skip sending files that have already been processed, and instead send only those files that have not been processed by the RAG framework.

The present techniques can facilitate a reduction in time spent on re-ingesting data with a RAG framework, as well as a reduction in network, compute, and storage usage. This can enable data scientists to run a data processing workflow frequently, and enable use of this to trigger automated processing of changed files to create a real-time RAG.

It can be challenging for a person to determine which files have changed on a large system. Computer storage systems can store billions of files. Additionally, it can be that RAG frameworks lack an ability to track these files as the protocols they use (e.g., NFS) do not offer this feature.

The present techniques can be implemented with a connector for a RAG framework, which can be integrated with a computer storage system metadata index management feature.

What follows is a sample workflow according to the present techniques:

1. A computer storage system with metadata index management can be installed and configured to send results on a periodic bases to a remote search server.

2. A developer (e.g., a data scientist) can develop a RAG application using a RAG framework.

3. The developer can download and install a document loader for RAG framework according to the present techniques.

4. The developer can provide a hostname, credentials and path on a computer storage system to ingest data to the RAG framework and data loader (e.g., class arguments to the document loader). In some RAG frameworks, a document loader can comprise a plugin (e.g., a separate programming language class) that can be optionally used. Where the document loader comprises a class, the class arguments can comprise options and/or parameters (e.g., hostname, credentials, etc.).

5. The developer can run the RAG framework with the document loader.

6. The document loader can do the following:
   (A) Receive a hostname, credentials and path as input parameters, and verify that they are correct. There can be a fail where it is determined that the input parameters are not valid.
   (B) Read a state file maintained by the document loader and determine if the provided path was previously run.
      I. If the state files does not exist, or the path was never previously run, continue to step 6 (D).
      II. If the state file exists and path was previously run, continue to step 6 (C).
      III. A state file can comprise a list of computer storage system paths, along with a generation identifier (ID). The generation ID can comprise an incremental number that is updated each time a new entry is added, or an existing entry is updated in the database. It can be that a state file does not contain duplicate entries for the same path, and one state file is created per metadata index management instance
   (C) Issue a search system scroll query to find all entries that have a generation ID that is greater than the one from the previous one. Pass the list of files to step 5.

(D) Pass the list of files or list of directories (paths) asynchronously to an existing RAG framework that processes data. In some examples, this can be done by chunking, embedding, etc.

(E) Update the state file to record a highest generation ID document loader processed from step 6 (D).

It can be that a data connector (used to ingest data into a RAG application) is not designed for multi-tenancy, as all instances write to a single state record. Where two or more RAG applications connect to the same metadata index management search system instance, there can be a risk that the applications could overwrite each other while writing to the same record. For example, the two applications could be processing the same files for different use cases.

A result can be that RAG applications that utilize a data connector could skip files when they should have been processed, but were not, because another application instance processed the files and marked them as completed.

Another problem can be that a single RAG application can have multiple versions, in which case, each version can be treated as a separate instance. This can occur when a new version of an application is released for testing with a limited set of users before a full production release. It can be that different versions are exploring different data processing strategies for the same set of files.

A solution to address these problems, according to the present techniques, can involve a data connector writing a unique state file per RAG application instance. Each state file can contain the RAG application name and version of that RAG application. This can solve the problems identified with a multi-tenancy scenario for a data connector.

That is, multiple RAG applications can read and update their own state file independently of each other. Additionally, different versions of the RAG application can keep track of their own processed files regardless of other versions.

It can be that handling multi-tenancy scenarios and versioning scenarios can be a nontrivial issue, and can be complex to solve. The present techniques can facilitate a data connector in creating a unique instance per RAG application, and also filter between different versions of the same RAG application.

What follows is a sample workflow according to the present techniques:

1. Two parameters can be added to a data connector: application name and application version.
2. When the data connector is called, it can check to see if a state file with the unique application name exists.
   (A) If it does exist, the data connector can check to see if the provided path on a computer storage system exists that matches the same application version provided in step 1. If an entry exists, step 3 is performed.
   (B) If no entry exists in the state file, step 4 is performed
3. Issue a search server scroll query to find all entries that have a generation ID that is greater than the one from the previous ingestion for that RAG application/version. Pass the list of files to step 5.
4. Pass the list of files or list of directories (paths) asynchronously to existing an RAG framework that processes data. In some examples, this can be done with chunking, embedding, etc.
5. Update the state file to record the highest generation ID that the document loader processed from step 4 for the specific application and version number.

Example Architectures, Etc.

FIG. 1 illustrates an example system architecture 100 that can facilitate multi-tenancy RAG ingestion versioning, in accordance with an embodiment of this disclosure.

System architecture 100 comprises computer system 102, communications network 104, and remote computer 106. In turn, computer system 102 comprises multi-tenancy RAG ingestion versioning component 108, storage system 110 (which comprises files 112), RAG application(s) 114 (which comprises chunks 116 and embeddings 118), RAG framework 120, state file(s) 122, and search system 124 (which comprises file metadata 126).

Figure 10:
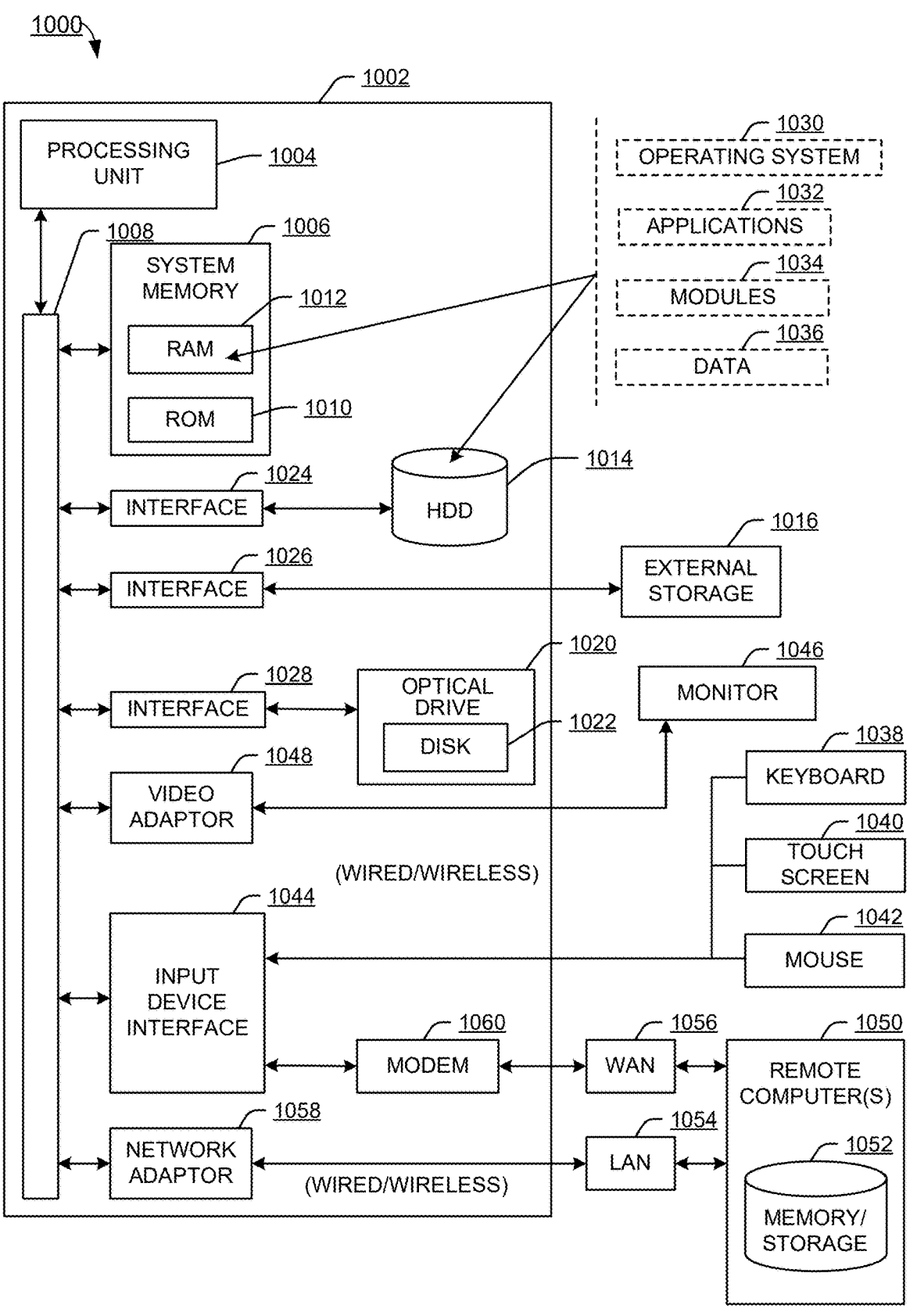
FIG. 10 illustrates an example block diagram of a computer operable to execute an embodiment of this disclosure.

Each of computer system 102 and/or remote computer 106 can be implemented with part(s) of computing environment 1000 of FIG. 10. Communications network 104 can comprise a computer communications network, such as the Internet, or an isolated private computer communications network.

RAG application(s) 114 can respond to queries based on information in files 112 stored in storage system 110. RAG application can store information in files 112 as chunks 116 (where a file can comprise multiple chunks) and embeddings 118 (where an embedding can comprise a numerical vector representation of a chunk, and wherein a similarity search between a vector representation of a query and the embeddings can be performed as part of a RAG application responding to the query).

RAG framework 120 (in conjunction with multi-tenancy RAG ingestion versioning component 108) can ingest files 112 into RAG application(s) 114. That is, RAG framework can copy the data of files 112 to RAG application(s) 114, including creating chunks and embeddings from files 112. In doing so, RAG framework 120 can perform versioning on the files so that only new or updated files are ingested, which can save on bandwidth and processing resources in ingesting data.

To do this, RAG framework 120 can maintain state file(s) 122, which can include information about files 112 and a most-recent version (e.g., a generation ID) that has been ingested into RAG application(s) 114.

Different state files of state file(s) 122 can correspond to different RAG applications and/or versions of those RAG applications. RAG framework 120 can identify a state file of state file(s) 122 that corresponds to the RAG application and/or application version.

When performing an ingestion, RAG framework 120 can access search system 124, which can store indexed (that is, more easily searchable than unindexed data) metadata for files 112 as file metadata 126 (where storage system 110 does not index file metadata). RAG framework 120 can use file metadata 126 to determine which files have been updated since a last ingest, and ingest only those files from files 112.

In some examples, multi-tenancy RAG ingestion versioning component 108 can perform this identification of new/updated files, and pass a list of those files to RAG framework 120 for ingesting.

With ingested data, RAG application(s) 114 can respond to queries that remote computer 106 makes to it via communications network 104.

In some examples, storage system 110 can, on a regular interval, transfer all new/modified metadata into search system 124. Each time this occurs, a generation ID for that new/modified metadata can be incremented. A query can be performed on search system 124 for entries that are larger than a generation ID identified in state file, and the returned entries (files and/or paths) can be returned to RAG framework 120.

In some examples, multi-tenancy RAG ingestion versioning component 108 can implement part(s) of the process flows of FIGS. 5-9 to facilitate multi-tenancy RAG ingestion versioning.

It can be appreciated that system architecture 100 is one example system architecture for multi-tenancy RAG ingestion versioning, and that there can be other system architectures that facilitate multi-tenancy RAG ingestion versioning.

FIG. 2 illustrates another example system architecture 200 that can facilitate multi-tenancy RAG ingestion versioning, in accordance with an embodiment of this disclosure. In some examples, part(s) of system architecture 200 can be implemented by part(s) of system architecture 100 to facilitate multi-tenancy RAG ingestion versioning.

System architecture 200 comprises storage system 202, metadata index management component 204, customer supplied hardware 206 (off storage box), storage system database 208, and multi-tenancy RAG ingestion versioning component 210 (which can be similar to multi-tenancy RAG ingestion versioning component 108 of FIG. 1).

In system architecture 200, it can be that there is not a facility to implement ingestion versioning, because the protocol used to ingest data does not maintain a state of a previous ingestion. This can be addressed in system architecture 300 of FIG. 3, with the use of state file(s) 320, among other components.

FIG. 3 illustrates another example system architecture 300 that can facilitate multi-tenancy RAG ingestion versioning, in accordance with an embodiment of this disclosure. In some examples, part(s) of system architecture 300 can be implemented by part(s) of system architecture 100 to facilitate multi-tenancy RAG ingestion versioning.

System architecture 300 comprises storage system 302, customer RAG application(s) 304, other RAG and application components 306, RAG framework 308, storage system metadata index management loader 310, existing file and directory loader 312, storage system connector to metadata index management 314, other RAG framework components 316, storage system database for metadata index management 318, and state file(s) 320.

Figure 4:
FIG. 4 illustrates an example state file that can facilitate multi-tenancy RAG ingestion versioning, in accordance with an embodiment of this disclosure.

FIG. 4 illustrates an example state file 400 that can facilitate multi-tenancy RAG ingestion versioning, in accordance with an embodiment of this disclosure. In some examples, part(s) of state file 400 can be implemented by part(s) of system architecture 100 to facilitate multi-tenancy RAG ingestion versioning.

State file 400 can be similar to state file(s) 320 of FIG. 3, and can indicate a last version ("generation") of different files and/or paths that have been ingested into a RAG application. State file can indicate a RAG a
Example Process Flows FIG. 5 illustrates an example process flow 500 that can facilitate multi-tenancy RAG ingestion versioning, in accordance with an embodiment of this disclosure. In some examples, one or more embodiments of process flow 500 can be implemented by system architecture 100 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts adding two parameters to a data connector: application name and application version.

After operation 504, process flow 500 moves to operation 506.

Operation 506 depicts the data connector, when called, checking to see if a state file with the unique application name exists. In some examples, operation 506 can be implemented with process flow 600 of FIG. 6.

After operation 506, process flow 500 moves to operation 508.

Operation 508 depicts issuing a search server scroll query to find all entries that have a generation ID that is greater than the one from the previous ingestion; passing the list of files to operation 512.

After operation 508, process flow 500 moves to operation 510.

Operation 510 depicts passing the list of files or list of directories (paths) asynchronously to existing an RAG framework that processes data. In some examples, this can be done with chunking, embedding, etc.

After operation 510, process flow 500 moves to operation 512.

Operation 512 depicts updating the state file to record the highest generation ID that the document loader processed from operation 510 for the specific application and version number.

After operation 512, process flow 500 moves to 514, where process flow 500 ends.

FIG. 6 illustrates another example process flow 600 that can facilitate multi-tenancy RAG ingestion versioning, in accordance with an embodiment of this disclosure. In some examples, one or more embodiments of process flow 600 can be implemented by system architecture 100 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 500 of FIG. 5, process flow 700 of FIG. 7, process flow 800 of FIG. 8, and/or process flow 900 of FIG. 9.

In some examples, process flow 600 can be used to implement operation 506 of FIG. 5.

Process flow 600 begins with 602, and moves to operation 604.

Operation 604 depicts, if the state file does exist, the data connector checking to see if the provided path on a computer storage system exists that matches the same application version provided in operation 504 of FIG. 5. If an entry exists, operation 508 of FIG. 5 is performed.

After operation 604, process flow 600 moves to operation 606.

Operation 606 depicts, if no entry exists in the state file, performing operation 510 of FIG. 5.

After operation 606, process flow 606 moves to 608, where process flow 600 ends.

FIG. 7 illustrates another example process flow 700 that can facilitate multi-tenancy RAG ingestion versioning, in accordance with an embodiment of this disclosure. In some examples, one or more embodiments of process flow 700 can be implemented by system architecture 100 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts storing a group of checkpoints that comprises respective pairs, the respective pairs comprising respective identifications of at least some respective data stored in a storage system and respective second generation identifiers that correspond to the at least some respective data, wherein a first checkpoint of the group of checkpoints corresponds to a first retrieval-augmented generation system of a group of retrieval-augmented generation systems for which a retrieval-augmented generation process is config-ured to ingest data, and wherein the retrieval-augmented generation process is configured to ingest data via a com-munications protocol that omits tracking of previously-ingested data. Using the example of FIG. 1, the group of checkpoints can be similar to state file(s) 122, the storage system can be similar to storage system 110, the group of retrieval-augmented generation systems can be similar to RAG application(s) 114, the retrieval-augmented generation process can be similar to RAG framework 120.

After operation 704, process flow 700 moves to operation 706.

Operation 706 depicts, based on executing the retrieval-augmented generation process comprising performance of an iteration of ingesting data from the storage system and to send the data to be ingested by the first retrieval-augmented generation system, identifying the first checkpoint among the group of checkpoints based on the first checkpoint comprising an indication of the first retrieval-augmented generation system, querying a search system to identify a first portion of the data having respective third generation identifiers that are greater than the respective second gen-eration identifiers in the first checkpoint, wherein the search system stores respective metadata of the at least some respective data from the storage system, and wherein the respective metadata comprises respective first generation identifiers that indicate respective updates to the respective data, ingesting the first portion of the data into the first retrieval-augmented generation system while refraining from ingesting a second portion of the data having corre-sponding fourth generation identifiers that are less than or equal to the corresponding second generation identifiers in the first checkpoint, and servicing queries to the first retrieval-augmented generation system based on the ingest-ing of the first portion of the data.

That is, when an ingestion is performed, the state file (that corresponds to the RAG application) can be determined, the search system (e.g., search system 124 of FIG. 1) can be queried to find files that have been created/updated since the last ingestion for that RAG application, those created/up-dated files can be ingested for the RAG application, and the RAG application can service queries based on those ingested created/updated files.

In some examples, the first retrieval-augmented genera-tion system comprises a first version of a group of versions, the first checkpoint comprises respective parts that corre-spond to respective versions of the group of versions, and the identifying of the first checkpoint among the group of checkpoints comprises identifying a first part of the first checkpoint from the respective parts based on the first checkpoint associating an identification of the first version with the first part. That is, a state file can have multiple sections for multiple versions of a particular RAG applica-tion, and a section for the version of the first RAG appli-cation can be determined.

In some examples, a second retrieval-augmented genera-tion system of the group of retrieval-augmented generation systems comprises a second version of the group of versions, the iteration of the ingesting of the data from the storage system is a first iteration of the ingesting of the data from the storage system, the indication of the first retrieval-aug-mented generation system is a first indication of the first retrieval-augmented generation system, and the operations further comprise, based on executing the retrieval-aug-mented generation process comprising performance of a second iteration of the ingesting of the data from the storage system and to the second retrieval-augmented generation system, identifying a second checkpoint among the group of checkpoints based on the second checkpoint comprising a second indication of the second retrieval-augmented gen-eration system, and performing the second iteration of the ingesting of the data based on the second checkpoint. That is, a second RAG application can have data ingested for it using the RAG framework.

In some examples, the first retrieval-augmented genera-tion system comprises a first version of a group of versions, the indication of the first retrieval-augmented generation system is a first indication of the first retrieval-augmented generation system, and the identifying of the first checkpoint among the group of checkpoints is based on a second identification of the first version. That is, in some examples, RAG application versioning can be implemented with a different state file for each version.

In some examples, the indication of the first retrieval-augmented generation system is determined based on a parameter to a call to invoke the performance of the iteration of the ingesting of the data from the storage system. In some examples, the indication of the first retrieval-augmented generation system is a first indication of the first retrieval-augmented generation system, wherein the first retrieval-augmented generation system comprises a first version of a group of versions, wherein the parameter is a first parameter, and wherein a second parameter of the call comprises a second indication of the first version of the group of versions of the first retrieval-augmented generation system. That is, an application name and/or an application version can be included in an API call to invoke ingesting data for that application/version.

In some examples, the identifying of the first checkpoint among the group of checkpoints based on the first check-point comprising the indication of the first retrieval-aug-mented generation system comprises determining whether the first checkpoint exists, to produce a result. In some examples, the result is a first result, the first result indicates that the first checkpoint exists, operation 706 comprises determining whether a path on the storage system that is identified as a parameter to a call to invoke the performance of the iteration of the ingesting of the data from the storage system is identified in the first checkpoint, to produce a second result. In some examples, the querying of the search system to identify the first portion of the data that has corresponding third generation identifiers that are greater than the corresponding second generation identifiers in the first checkpoint is based on the second result indicating that the path is identified in the first checkpoint. That is, it can be determined whether a path of data to be ingested exists, and where it exists, then selectively ingesting new/updated data can be performed. In examples where the path is not identified, it can be that all data from the path is ingested, regardless of a time at which it was created/updated.

After operation 706, process flow 700 moves to 708, where process flow 700 ends.

FIG. 8 illustrates another example process flow 800 that can facilitate multi-tenancy RAG ingestion versioning, in accordance with an embodiment of this disclosure. In some examples, one or more embodiments of process flow 800 can be implemented by system architecture 100 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts storing a group of checkpoints that comprise pairs, respective pairs of the pairs comprising respective identifications of respective data stored in a storage system and respective second generation identifiers that correspond to the respective data. In some examples, operation 804 can be implemented in a similar manner as operation 704 of FIG. 7.

After operation 804, process flow 800 moves to operation 806.

Operation 806 depicts, based on executing a retrieval-augmented generation process comprising performance of an iteration of ingesting the data from the storage system and to send the data to be ingested by a first retrieval-augmented generation system of a group of retrieval-augmented generation systems, identifying a first checkpoint among the group of checkpoints based on the first checkpoint comprising an indication of the first retrieval-augmented generation system, querying a search system to identify a first portion of the data having respective third generation identifiers that are greater than the respective second generation identifiers in the first checkpoint, wherein the search system stores respective metadata of the at least some respective data from the storage system, and wherein the respective metadata comprises respective first generation identifiers that indicate respective updates to the respective data, ingesting the first portion of the data into the first retrieval-augmented generation system while refraining from ingesting a second portion of the data having corresponding fourth generation identifiers that are less than or equal to the corresponding second generation identifiers in the first checkpoint, and servicing queries to the first retrieval-augmented generation system based on the ingesting of the first portion of the data. In some examples, operation 806 can be implemented in a similar manner as operation 706 of FIG. 7.

In some examples, operation 806 comprises, based on the retrieval-augmented generation process performing a second iteration of the ingesting of the data from the storage system, determining whether a second checkpoint exists, to produce a result, wherein the second checkpoint corresponds to the second iteration, and wherein the second checkpoint comprises the first checkpoint or another checkpoint other than the first checkpoint, and, responsive to the result indicating that the second checkpoint does not exist, passing second data to the retrieval-augmented generation process independently of whether the second data has previously been passed to the retrieval-augmented generation process. That is, where an iteration is performed and a corresponding state file does not exist, all specified data can be ingested, regardless of when the data was created/updated.

In some examples, operation 806 comprises, based on executing the retrieval-augmented generation process comprising performance a second iteration of the ingesting of the data from the storage system, determining whether a second checkpoint exists, to produce a result, wherein the second checkpoint corresponds to the second iteration, and wherein the second checkpoint comprises the first checkpoint or another checkpoint other than the first checkpoint, and, responsive to the result indicating that the second checkpoint exists and that a path for the second iteration is not identified by the first checkpoint, passing second data to the retrieval-augmented generation process independently of whether the second data has previously been passed to the retrieval-augmented generation process. That is, where an iteration is performed and a corresponding state file does exist, but a path for this iteration (e.g., a path on the storage system that is to be ingested) is not specified in the state file, all specified data can be ingested, regardless of when the data was created/updated.

In some examples, the first portion of the data comprises at least one file. In some examples, the first portion of the data comprises at least one directory. That is, a list of files and/or directories to be ingested can be determined, and the data in those files and/or directory can be ingested (e.g., to produce chunks and/or embeddings).

After operation 806, process flow 800 moves to 808, where process flow 800 ends.

FIG. 9 illustrates another example process flow 900 that can facilitate multi-tenancy RAG ingestion versioning, in accordance with an embodiment of this disclosure. In some examples, one or more embodiments of process flow 900 can be implemented by system architecture 100 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 500 of FIG. 5, process flow 600 of FIG. 6, process flow 700 of FIG. 7, and/or process flow 800 of FIG. 8.

Process flow 900 begins with 902, and moves to operation 904.

Operation 904 depicts, based on executing a retrieval-augmented generation framework comprising performance of an iteration of ingesting data from a storage system and to send the data to be ingested by a first retrieval-augmented generation system, identifying a first state file among a group of state files based on the first state file comprising an indication of the first retrieval-augmented generation system. In some examples, operation 904 can be implemented in a similar manner as operation 806 of FIG. 8 as applied to identifying a state file.

In some examples, a group of retrieval-augmented generation systems comprises the first retrieval-augmented generation system, and the retrieval-augmented generation framework is configured to ingest the data for respective retrieval-augmented generation systems of the group of retrieval-augmented generation systems.

After operation 904, process flow 900 moves to operation 906.

Operation 906 depicts querying a search system to identify a first portion of the data having respective third generation identifiers that are greater than the respective second generation identifiers in the first state file, wherein the search system stores respective metadata of the respective data from the storage system, wherein the respective metadata comprises respective first generation identifiers that indicate respective updates to the respective data. In some examples, operation 904 can be implemented in a similar manner as operation 806 of FIG. 8 as applied to querying a search system.

After operation 906, process flow 900 moves to operation 908.

Operation 908 depicts ingesting the first portion of the data into the first retrieval-augmented generation system while refraining from ingesting a second portion of the data having corresponding fourth generation identifiers that are less than or equal to the corresponding second generation identifiers in the first state file. In some examples, operation 904 can be implemented in a similar manner as operation 806 of FIG. 8 as applied to ingesting a portion of data.

After operation 908, process flow 900 moves to operation 910.

Operation 910 depicts servicing queries to the first retrieval-augmented generation system based on the ingesting of the first portion of the data. In some examples, operation 904 can be implemented in a similar manner as operation 806 of FIG. 8 as applied to servicing queries.

In some examples, the ingesting of the first portion of the data into the first retrieval-augmented generation system comprises asynchronously passing the first portion of the data to the retrieval-augmented generation framework.

In some examples, the performance of the iteration of the ingesting of the data from the storage system comprises determining that the first state file exists based on a name of the first retrieval-augmented generation system.

In some examples, operation 906 comprises, after the determining that the first state file exists, determining that an identification of a version of the first retrieval-augmented generation system exists in the first state file.

In some examples, operation 906 comprises determining that a path on the storage system that corresponds to the performance of the iteration of the ingesting of the data is identified in the first state file for the identification of the version of the first retrieval-augmented generation system.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of computer system 102 and/or remote computer 106 of FIG. 1.

In some examples, computing environment 1000 can implement one or more embodiments of the process flows of FIGS. 5-9 to facilitate multi-tenancy RAG ingestion versioning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1016 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

20

What is claimed is:

1. A system, comprising:
at least one processor; and
at least one memory that stores executable instructions that, when executed by the at least one processor, facilitate performance of operations, comprising:
storing a group of checkpoints that comprises respective pairs, the respective pairs comprising respective identifications of at least some respective data stored in a storage system and respective second generation identifiers that correspond to the at least some respective data, wherein a first checkpoint of the group of checkpoints corresponds to a first retrieval-augmented generation system of a group of retrieval-augmented generation systems for which a retrieval-augmented generation process is configured to ingest data, and wherein the retrieval-augmented generation process is configured to ingest data via a communications protocol that omits tracking of previously-ingested data; and
based on executing the retrieval-augmented generation process comprising performance of an iteration of ingesting data from the storage system and to send the data to be ingested by the first retrieval-augmented generation system,
identifying the first checkpoint among the group of checkpoints based on the first checkpoint comprising an indication of the first retrieval-augmented generation system,
querying a search system to identify a first portion of the data having respective third generation identifiers that are greater than the respective second generation identifiers in the first checkpoint, wherein the search system stores respective metadata of the at least some respective data from the storage system, and wherein the respective metadata comprises respective first generation identifiers that indicate respective updates to the respective data,
ingesting the first portion of the data into the first retrieval-augmented generation system while refraining from ingesting a second portion of the data having corresponding fourth generation identifiers that are less than or equal to the corresponding second generation identifiers in the first checkpoint, and
servicing queries to the first retrieval-augmented generation system based on the ingesting of the first portion of the data.

2. The system of claim 1, wherein the first retrieval-augmented generation system comprises a first version of a group of versions, wherein the first checkpoint comprises respective parts that correspond to respective versions of the group of versions, and wherein the identifying of the first checkpoint among the group of checkpoints comprises:
identifying a first part of the first checkpoint from the respective parts based on the first checkpoint associating an identification of the first version with the first part.

3. The system of claim 2, wherein a second retrieval-augmented generation system of the group of retrieval-augmented generation systems comprises a second version of the group of versions, wherein the iteration of the ingesting of the data from the storage system is a first iteration of the ingesting of the data from the storage system, wherein the indication of the first retrieval-augmented generation system is a first indication of the first retrieval-augmented generation system, and wherein the operations further comprise:

based on executing the retrieval-augmented generation process comprising performance of a second iteration of the ingesting of the data from the storage system and to the second retrieval-augmented generation system, identifying a second checkpoint among the group of checkpoints based on the second checkpoint comprising a second indication of the second retrieval-augmented generation system, and performing the second iteration of the ingesting of the data based on the second checkpoint.

4. The system of claim 1, wherein the first retrieval-augmented generation system comprises a first version of a group of versions, wherein the indication of the first retrieval-augmented generation system is a first indication of the first retrieval-augmented generation system, and wherein the identifying of the first checkpoint among the group of checkpoints is based on a second identification of the first version.

5. The system of claim 1, wherein the indication of the first retrieval-augmented generation system is determined based on a parameter to a call to invoke the performance of the iteration of the ingesting of the data from the storage system.

6. The system of claim 5, wherein the indication of the first retrieval-augmented generation system is a first indication of the first retrieval-augmented generation system, wherein the first retrieval-augmented generation system comprises a first version of a group of versions, wherein the parameter is a first parameter, and wherein a second parameter of the call comprises a second indication of the first version of the group of versions of the first retrieval-augmented generation system.

7. The system of claim 1, wherein the identifying of the first checkpoint among the group of checkpoints based on the first checkpoint comprising the indication of the first retrieval-augmented generation system comprises:

determining whether the first checkpoint exists, to produce a result.

8. The system of claim 7, wherein the result is a first result, wherein the first result indicates that the first checkpoint exists, and wherein the operations further comprise:

determining whether a path on the storage system that is identified as a parameter to a call to invoke the performance of the iteration of the ingesting of the data from the storage system is identified in the first checkpoint, to produce a second result.

9. The system of claim 8, wherein the querying of the search system to identify the first portion of the data that has corresponding third generation identifiers that are greater than the corresponding second generation identifiers in the first checkpoint is based on the second result indicating that the path is identified in the first checkpoint.

10. A method, comprising:

storing, by a system comprising at least one processor, a group of checkpoints that comprise pairs, respective pairs of the pairs comprising respective identifications of respective data stored in a storage system and respective second generation identifiers that correspond to the respective data; and based on executing a retrieval-augmented generation process comprising performance of an iteration of ingesting the data from the storage system and to send the data to be ingested by a first retrieval-augmented generation system of a group of retrieval-augmented generation systems, identifying, by the system, a first checkpoint among the group of checkpoints based on the first checkpoint comprising an indication of the first retrieval-augmented generation system, querying, by the system, a search system to identify a first portion of the data having respective third generation identifiers that are greater than the respective second generation identifiers in the first checkpoint, wherein the search system stores respective metadata of the at least some respective data from the storage system, and wherein the respective metadata comprises respective first generation identifiers that indicate respective updates to the respective data, ingesting, by the system, the first portion of the data into the first retrieval-augmented generation system while refraining from ingesting a second portion of the data having corresponding fourth generation identifiers that are less than or equal to the corresponding second generation identifiers in the first checkpoint, and servicing, by the system, queries to the first retrieval-augmented generation system based on the ingesting of the first portion of the data.

11. The method of claim 10, further comprising:

based on the retrieval-augmented generation process performing a second iteration of the ingesting of the data from the storage system, determining, by the system, whether a second checkpoint exists, to produce a result, wherein the second checkpoint corresponds to the second iteration, and wherein the second checkpoint comprises the first checkpoint or another checkpoint other than the first checkpoint; and responsive to the result indicating that the second checkpoint does not exist, passing second data to the retrieval-augmented generation process independently of whether the second data has previously been passed to the retrieval-augmented generation process.

12. The method of claim 10, further comprising:

based on executing the retrieval-augmented generation process comprising performance a second iteration of the ingesting of the data from the storage system, determining, by the system, whether a second checkpoint exists, to produce a result, wherein the second checkpoint corresponds to the second iteration, and wherein the second checkpoint comprises the first checkpoint or another checkpoint other than the first checkpoint; and responsive to the result indicating that the second checkpoint exists and that a path for the second iteration is not identified by the first checkpoint, passing second data to the retrieval-augmented generation process independently of whether the second data has previously been passed to the retrieval-augmented generation process.

13. The method of claim 10, wherein the first portion of the data comprises at least one file.

14. The method of claim 10, wherein the first portion of the data comprises at least one directory.

15. A non-transitory computer-readable medium comprising instructions that, in response to execution, cause a system comprising at least one processor to perform operations, comprising:

based on executing a retrieval-augmented generation framework comprising performance of an iteration of ingesting data from a storage system and to send the data to be ingested by a first retrieval-augmented generation system, identifying a first state file among a group of state files based on the first state file comprising an indication of the first retrieval-augmented generation system;

querying a search system to identify a first portion of the data having respective third generation identifiers that are greater than the respective second generation identifiers in the first state file, wherein the search system stores respective metadata of the respective data from the storage system, wherein the respective metadata comprises respective first generation identifiers that indicate respective updates to the respective data;

ingesting the first portion of the data into the first retrieval-augmented generation system while refraining from ingesting a second portion of the data having corresponding fourth generation identifiers that are less than or equal to the corresponding second generation identifiers in the first state file; and servicing queries to the first retrieval-augmented generation system based on the ingesting of the first portion of the data.

16. The non-transitory computer-readable medium of claim 15, wherein the ingesting of the first portion of the data into the first retrieval-augmented generation system comprises:

asynchronously passing the first portion of the data to the retrieval-augmented generation framework.

17. The non-transitory computer-readable medium of claim 15, wherein the performance of the iteration of the ingesting of the data from the storage system comprises:

determining that the first state file exists based on a name of the first retrieval-augmented generation system.

18. The non-transitory computer-readable medium of claim 17, wherein the operations further comprise:

after the determining that the first state file exists, determining that an identification of a version of the first retrieval-augmented generation system exists in the first state file.

19. The non-transitory computer-readable medium of claim 18, wherein the operations further comprise:

determining that a path on the storage system that corresponds to the performance of the iteration of the ingesting of the data is identified in the first state file for the identification of the version of the first retrieval-augmented generation system.

20. The non-transitory computer-readable medium of claim 15, wherein a group of retrieval-augmented generation systems comprises the first retrieval-augmented generation system, and wherein the retrieval-augmented generation framework is configured to ingest the data for respective retrieval-augmented generation systems of the group of retrieval-augmented generation systems.

* * * * *